(12) United States Patent
Schaaf et al.

(10) Patent No.: US 11,512,802 B2
(45) Date of Patent: Nov. 29, 2022

(54) SLIDING SLEEVE, SLIDING SLEEVE CONNECTION AND METHOD FOR PRODUCING A SLIDING SLEEVE CONNECTION

(71) Applicant: REHAU Construction LLC., Leesburg, VA (US)

(72) Inventors: Thomas Schaaf, Höchstadt a.d. Aisch (DE); Hansi Homburg, Höchstadt a.d. Aisch (DE); Oliver Vocks, Fürth (DE); Andreas Kirchberger, Herzogenaurach (DE)

(73) Assignee: REHAU CONSTRUCTION LLC, Leesburg, VA (US)

( * ) Notice: Subject to any disclaimer, the term of this patent is extended or adjusted under 35 U.S.C. 154(b) by 560 days.

(21) Appl. No.: 16/063,933

(22) PCT Filed: Dec. 19, 2016

(86) PCT No.: PCT/EP2016/002133
§ 371 (c)(1),
(2) Date: Jun. 19, 2018

(87) PCT Pub. No.: WO2017/108172
PCT Pub. Date: Jun. 29, 2017

(65) Prior Publication Data
US 2020/0271260 A1    Aug. 27, 2020

(30) Foreign Application Priority Data
Dec. 21, 2015   (DE) .......................... 102015122345.7

(51) Int. Cl.
*F16L 33/207*     (2006.01)
*F16L 37/138*     (2006.01)

(52) U.S. Cl.
CPC ......... *F16L 37/138* (2013.01); *F16L 33/2071* (2013.01)

(58) Field of Classification Search
CPC ... F16L 37/138; F16L 33/2071; F16L 13/146; F16L 21/00; F16L 21/007; F16L 33/225;
(Continued)

(56) References Cited

U.S. PATENT DOCUMENTS 2,319,024 A * 5/1943 Wehringer ............ F16L 33/226
5,181,752 A    1/1993 Benson et al.
(Continued)

FOREIGN PATENT DOCUMENTS

DE     19756074 C1 *  9/1999   .......... F16L 33/2071
DE     101 30 858 A1   1/2003
(Continued)

OTHER PUBLICATIONS

International Search Report for PCT/EP2016/002133, dated Mar. 10, 2017; English Translation submitted herewith (8 pages).
(Continued)

*Primary Examiner* — Matthew Troutman
*Assistant Examiner* — William S. Choi
(74) *Attorney, Agent, or Firm* — Fitch, Even, Tabin & Flannery, LLP

(57) ABSTRACT

A sliding sleeve for axially sliding onto an expanded end of an all-plastic pipe or a plastic composite pipe, into which is slid a support body having circumferential external ribs of an connecting element is made of an elastically-deformable polymeric material. The internal surface of the sliding sleeve has an average roughness value $R_a$ in a range starting from 1 μm to half of the average wall thickness of the sliding sleeve. In another embodiment, the inner surface of the sliding sleeve has a plurality of macroscopic irregularities,
(Continued)

Figure 1:
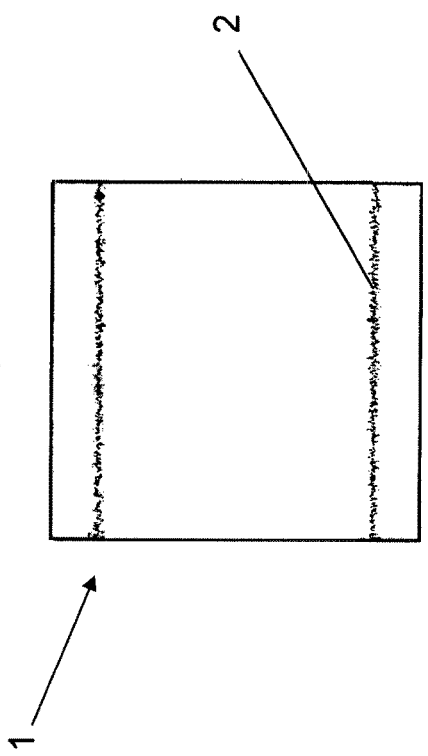

the depth of which does not exceed half of the average wall thickness of the sliding sleeve.

20 Claims, 3 Drawing Sheets

(58) Field of Classification Search
CPC . F16L 33/22; F16L 21/06; F16L 33/20; F16L 33/207; F16L 33/2076; F16L 33/226; F16L 47/06; F16L 47/065
USPC ......... 285/86, 235, 260, 345, 369, 371, 372, 285/382, 417, 418, 423, 294.1, 356, 343
See application file for complete search history.

(56) References Cited

U.S. PATENT DOCUMENTS

| | | | |
|---|---|---|---|
| 6,715,800 B1* | 4/2004 | Hennig | ............... F16L 33/225 |
| 7,874,925 B2* | 1/2011 | Dewhirst | |
| 2009/0152864 A1 | 6/2009 | Olinger et al. | |
| 2010/0025986 A1 | 2/2010 | Seton-Anderson | |
| 2010/0194099 A1* | 8/2010 | Rippstein | |
| 2011/0052126 A1* | 3/2011 | Yamamoto | |
| 2011/0109084 A1 | 5/2011 | Bonhag et al. | |
| 2015/0176735 A1* | 6/2015 | Baldwin | |

FOREIGN PATENT DOCUMENTS

| | | | |
|---|---|---|---|
| DE | 102004026897 A1 | 2/2005 | |
| DE | 202008008554 U1 | 11/2009 | |
| EP | 0756683 B1 * | 9/1998 | ............ F16L 33/225 |
| EP | 1617123 A1 * | 1/2006 | ............ F16L 13/146 |
| WO | 92/00483 A1 | 1/1992 | |

OTHER PUBLICATIONS

Office Action dated May 11, 2022 in counterpart MX Appln. No. MX/a/2018/007651.

* cited by examiner

SLIDING SLEEVE, SLIDING SLEEVE CONNECTION AND METHOD FOR PRODUCING A SLIDING SLEEVE CONNECTION

CROSS-REFERENCE TO RELATED APPLICATIONS

This application is a U.S. national phase application filed under 35 U.S.C. § 371 of International Application No. PCT/EP2016/002133, filed Dec. 19, 2016, designating the United States, which claims priority from German Patent Application No. 102015122345.7 filed Dec. 21, 2015, which are hereby incorporated herein by reference in their entirety.

The present invention relates to a sliding sleeve for axially pushing or sliding onto an expanded end of an all-plastic pipe or of a plastic composite pipe, into which a supporting body having circumferential external ribs of a connecting element is slid or pushed, wherein the sliding sleeve is made of an elastically deformable polymeric material. Furthermore, the present invention relates to a sliding-sleeve connection between an end of an all-plastic pipe or a plastic composite pipe and a connecting element, comprising the sliding-sleeve according to the invention, as well as to a method for producing such a sliding-sleeve connection.

Pipe connections of the above type are known from prior art. In addition to at least one end of an all-plastic pipe or a plastic composite pipe, such a pipe connection includes a connecting element having at least one support body, which support body, in turn comprises a support body provided with circumferential external ribs, onto which the end of the pipe is sild. Fixing the end of the pipe to the connecting element is effected by means of a fixing sleeve arranged above the end of the pipe, through which the end of the pipe is pressed on the outer contour of the support body provided with circumferential external ribs. Depending on the type of application of the fixing sleeve used, different types of application techniques are distinguished. As examples of such connecting technique are stated shrinkable sleeve systems, in which a fixing sleeve with shape memory is expanded together with the end of the pipe, the supporting body is then inserted into the expanded end of the pipe and the shrinkable sleeve presses the end of the pipe to the outer contour of the support body by means of its shrinkage due to the memory effect, as well as axial pressing systems, in which the support body is inserted into an expanded end of a pipe and subsequently, a sliding sleeve externally attached to the end of the pipe is pushed in axial direction onto the end with the inserted support body of the connecting element. Such an axial pressing system with a sliding sleeve is described in DE 101 30 858 A1, for example. The sliding sleeve described therein is made of an elastically deformable polymeric material. In order to achieve reliable sealing with axial pressing systems of said type, a smaller internal diameter of the sliding sleeve relative to the external diameter of the expanded end of the pipe is required. However, the smaller the internal diameter of the sliding sleeve relative to the external diameter of the expanded end of the pipe, the greater the force to be exerted for axially sliding the sliding sleeve onto the expanded end of the pipe with the support body inserted. In order to decrease said force to be exerted, a lubricating lacquer is applied to the internal surface of the sliding sleeve during the production thereof in practice. This leads to an increased method-related effort in the production of the sliding sleeve. Furthermore, particularly if a lubricating lacquer is used, particular in the event of thermal cycling, there may occur a relative movement of the sliding sleeve on the expanded end of the pipe, possibly resulting in that the sealing of the pipe connection is no longer ensured.

It is therefore the object of the present invention to provide a sliding sleeve made of an elastically deformable polymeric material, that overcomes the disadvantages of the prior art. In particular, the sliding sleeve according to the invention, at a given internal diameter, is to be slid onto the expanded end of the pipe with the support body inserted by means of axial pressing technique with a reduced pressing force when producing the pipe connection. Furthermore, in a simple manner the sliding sleeve according to the invention shall have a reduced tendency for relative movement of the sliding sleeve on the expanded end of the pipe in the event of thermal cycling or such relative movement is to be completely prevented, and shall be easy to produce.

The above and other objects according to the present invention are achieved by means of a sliding sleeve having the features of claim 1 or claim 6, by means of a sliding sleeve connection having the features of claim 10 or by means of a method having the features of claim 12. Preferred embodiments of the sliding sleeve, the sliding sleeve-connection and the method according to the invention are described in the respective dependent claims.

According to the present invention, it has been found that an increased roughness or irregularity at the internal surface of the sliding sleeve compared to the smooth internal surfaces of sliding sleeves for axial pressing systems so far known from prior art leads to a reduction of the force which has to be exerted for axially pushing the respective sliding sleeve on the expanded end of the pipe with the support body inserted therein. Simultaneously, an internal surface of the sliding sleeve having an increased roughness comes with a reduced tendency for relative movement of the sliding sleeve on the expanded end of the pipe, in particular in the event of thermal cycling. These two significant advantages of the rough internal surface of the sliding sleeve can be observed from an average roughness value $R_a$ of 1 μm of the internal surface of the sliding sleeve. If said average roughness value $R_a$ of the internal surface of the sliding sleeve exceeds half the average wall thickness of the sliding sleeve, it may happen that a sufficient pressure is not applied to the expanded end of the pipe with the support body of the connecting element inserted therein. This could lead to a less tight sliding sleeve connection. Alternatively, said effect of the reduced force effort when axially sliding on the sliding sleeve could as well be caused by irregularities on the internal surface, said irregularities, in turn, having such a macroscopic size, that they can not be determined by means of the conventional measuring methods for determining the surface roughness and thus cannot be characterized by the average roughness value. These irregularities are herein described as "macroscopic irregularities".

Accordingly, it is the object of the present invention to provide a sliding sleeve for axially sliding onto an expanded end of an all-plastic pipe or a plastic composite pipe into which a support body of a connecting element provided with circumferential external ribs is inserted, wherein the sliding sleeve is made of an elastically deformable polymeric material, wherein the internal surface has an average roughness value $R_a$ in a range from 1 μm to half of the average wall thickness of the sliding sleeve. Alternatively, the present invention also relates to a sliding sleeve for axially sliding or pushing onto an expanded end of an all-plastic pipe or a plastic composite pipe in to which a support body of a connecting element having circumferential external ribs is inserted, wherein the sliding sleeve is made of an elastically deformable polymeric material, wherein the internal surface of the sliding sleeve has a plurality of macroscopic irregularities, the depth of which does not exceed half of the average wall thickness of the sliding sleeve. The present invention further relates to a sliding sleeve connection between an end of an all-plastic pipe or of a plastic composite pipe, a connecting element having at least one support body provided with circumferential external ribs, onto which the expanded end of the all-plastic pipe or the plastic-composite pipe in the final sliding sleeve connection is slid, and which comprises a sliding sleeve according to the invention, which is axially slid onto the expanded end. Finally, the present invention also relates to a method for producing a connection between an end of an all-plastic pipe or a plastic composite pipe and a connecting element having at least one support body provided with circumferential external ribs, comprising the following steps of expanding the end of the all-plastic pipe or the plastic-composite pipe, inserting the support body of the connecting element into the expanded end of the all-plastic pipe or plastic-composite pipe and pressing a sliding sleeve made of an elastically deformable polymeric material in axial direction onto the expanded end having the support body inserted therein, wherein the internal surface of the sliding sleeve has an average roughness value $R_a$ of 1 µm to half of the average wall thickness of the sliding sleeve or a plurality of macroscopic irregularities, the depth of which does not exceed half of the average wall thickness of the siding sleeve.

As used herein, the term "average roughness value" or "average roughness" (indicated by the symbol "$R_a$") of a surface means the arithmetic average of the variation on the mount of all measurement points on the surface from the central line of the surface.

In view of the sliding sleeve according to the invention, it can be advantageous if the internal surface of the sliding sleeve has an average roughness value $R_a$ in a range between 3 µm to 1000 µm, preferably in a range from 3 µm to 50 µm. In the average value ranges mentioned, a particularly balanced ratio between reduced force required for axial sliding and sufficient stability of the resulting sliding sleeve connection according to the invention is achieved. The value ranges for the average roughness value $R_a$ apply irrespective of the direction of measurement and particularly preferred in radial direction of measurement.

It may as well prove to be advantageous if the internal surface of the sliding sleeve ranges above an averaged roughness depth $R_z$ in a range from 5 µm to half the average wall thickness of the sliding sleeve, preferably in a range from 10 µm to half the average wall thickness of the sliding sleeve, preferably in a range from 10 µm to 2000 µm and particularly preferred in a range from 20 µm to 200 µm. In the mentioned ranges, of the average roughness depth, there results a balanced ratio between reduced force required for axially sliding onto and sufficient proper elasticity of the sliding sleeve according to the invention.

As used herein, the term "averages roughness depth" (indicated by the symbol "$R_z$") of a surface the roughness depth in accordance with DIN EN ISO 4287/4288.

It may as well be advantageous if the internal surface of the sliding sleeve has grooves in a circumferential direction, in longitudinal direction, grooves extending helically and/or a combination of the types of grooves mentioned. Such configurations of the internal surface have proved to be of particular advantage and are easy to produce. Further preferred configurations of the internal surface of the sliding sleeve according to the invention are an irregular surface, e.g. produced by filling materials having according particulate diameters, lozenge patterns, negative shapes of an eroded structure and similar. These embodiments can preferably be produced in that the properties of the internal surface of the sliding sleeve according to the invention have been generated in the course of an extrusion of a pipe, from which the sliding sleeve has been obtained by means of cutting the extruded pipe to length. As an alternative, the respective pipe can be extruded and subsequently the properties of the internal surface can be produced afterwards. Finally, the sliding sleeves can be cut off of the extruded pipe and the properties of the internal surface can be generated afterwards. Also cold forming methods such as knurling and punching, hot stamping as well as injection molding by means of a molding tool having the desired internal surface as a negative form, or the later production of the internal surface in injection-molded sleeves, are possible for producing the surface roughness of the internal surface of the sliding sleeve.

Advantageously, crosslinked polyethylene (in particular PE-Xa, PE-Xb or PE-Xc) is used for the production of the sliding sleeve according to the invention.

Regarding the sliding sleeve connection according to the invention, it may be advantageous if the sliding sleeve encloses the expanded end of the all-plastic pipe or of the plastic composite pipe in an elastically expanded manner. This way, sealing of the sliding sleeve connection according to the invention is further improved.

According to the present invention, preferred materials for the connecting element are polymeric materials such as polypropylene and glass fiber-reinforced polypropylene, polyamides and glass fiber-reinforced polyamides, temperature-resistant thermoplastics such as polyphenylene sulphone (PPSU), polyvinylidene fluoride (PVDF), polyether sulphone (PES), polysulfone (PSU), polyphenylsulphide (PPS) and polyester carbonate (PESC) as well as copolymers and blend of said polymers, wherein the mentioned polymeric materials can be implemented fiber-reinforced, in particular glass fiber-reinforced, as well as metallic materials such as brass, for example, in particular Ecobrass®, red brass and stainless steel. Temperature-resistant thermoplastics such as in particular polyphenylene sulphone and polyvinylidene fluoride are particularly preferred for the production of the connecting element according to the invention. The term "temperature-resistant thermoplastics" as used herein relates to the heat resistance and thermal stability of said group of materials and designates thermoplastic polymeric materials having a thermal stability at temperatures of at least 150° C. The upper limit of the temperature, in which a synthetic material of this type can be used, depends of the material used, whereas the implementability of such polymeric materials ends with a temperature of 260° C. maximum.

According to the present invention, preferably all-plastic pipes are used as plastic pipes, preferably made of polyethylene (PE, in particular PE 100 and PE-RT), crosslinked polyethylene (PE-X, in particular PE-Xa, PE-Xb or PE-Xc) polypropylene (in particular statistic polypropylene PP-R) and polybutylene (PB) as well as plastic-composite pipes, preferably with layers of polyethylene (PE, in particular PE 100 and PE-RT) crosslinked polyethylene (PE-Xa, PE-Xb or PE-XC) polypropylene (in particular statistic polypropylene PP-R), and/or polybutylene (PB) are used. In addition, an oxygen barrier layer of ethylene-vinyl alcohol copolymer (EVOH). According to the present invention, metal-composite pipes (MCP pipes) according to the present invention preferably include layers of polyethylene (PE, in particular PE 100 and PE-RT), crosslinked polyethylene (PE-X, in particular PE-Xa, PE, Xb or PE-Xc), polypropylene (in particular statistic polypropylene PP-R) and/or Polybutylene (PB) and at least one layer of metals preferably aluminum. The metallic layer is preferably butt-welded. Layers of adhesive agents can be introduced between individual layers in plastic-composite pipes and MPC pipes. According to the present invention, all pipes of a pipe connection can be structured identically or one or more of the pipes may have different pipe structures. Furthermore, the pipes according to the present invention may be fiber-reinforced as well. The fiber-reinforcement may be provided in individual pipes or all pipes, over the entire pipe length or in sections only. Regarding the plastic pipe of the metal-plastic composite pipe of the pipe connection according to the invention, it is particularly preferred that at least one layer of the respective pipe includes crosslinked polyethylene (in particular PE-Xa, PE-Xb, or PE-Xc). Crosslinked polyethylene is a material having a shape memory, respectively a so-called "memory effect". Such memory effect means that the cross-linked polyethylene tries to return to its original shape after any change in its external geometry. During pipe expansion, this causes any pipe including PE-X to try to return to the original internal pipe diameter before the expansion. As a support body of a connecting element is inserted in the expanded end of the pipe after expansion, the memory effect when using a pipe including at least one layer of cross-linked polyethylene leads to a particularly high tightness of the sliding sleeve connection according to the invention.

The connecting element of the sliding sleeve connection according to the invention can be a threaded moulded part or a threadless moulded part, i.e. a connecting element with no thread. This in particular includes connecting pieces, connection brackets, multiple distributors, t-pieces, wall t-pieces, wall brackets, system transitions, transition pieces, angled transition pieces, none of which have a thread. Accordingly, the term "threaded moulded part" refers to a connecting element having at least one threaded moulded part. This in particular includes connecting pieces, connection brackets, multiple distributors, t-pieces, wall t-pieces, wall brackets, system transitions, transition pieces and angled transition pieces, all of which have at least one internal and/or external thread.

The sliding sleeve connection according to the present invention is in particular used in piping and connection systems in drinking water installation, in sprinkler systems, in radiator connections, in concrete core temperature controls as well as in surface heating or surface cooling systems or even in fermenter heating devices or for the ventilation of filter beds.

The features deemed to be advantageous related to the sliding sleeve according to the invention as well apply accordingly for the sliding sleeve connection according to the invention and the method according to the invention.

DESCRIPTION OF PREFERRED EMBODIMENTS

Figure 2:
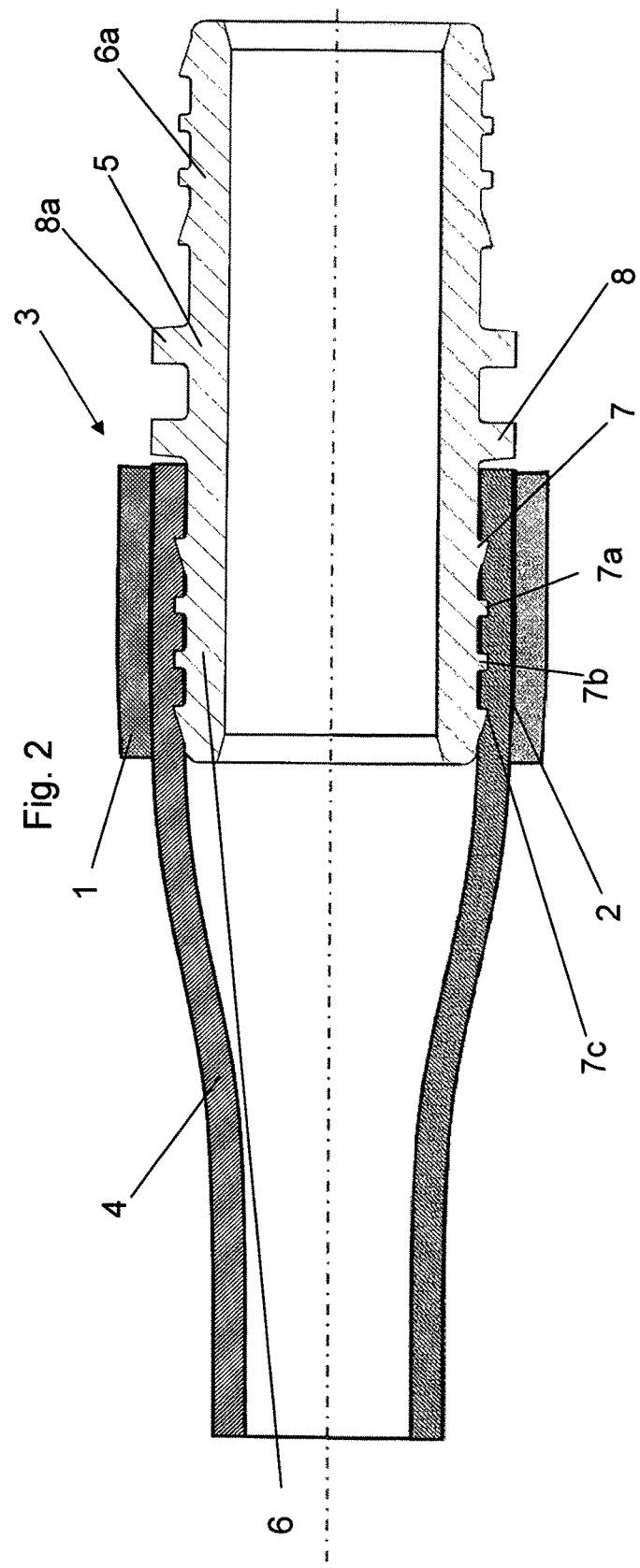
Figure 3:
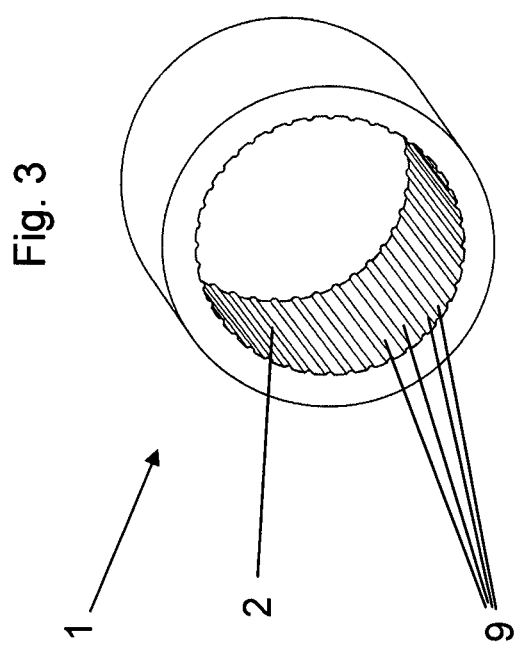

In the following, the invention is to be described in detail with reference to the embodiments illustrated in the figures. The figures show in:

FIG. 1 an illustration of a longitudinal section of a sliding sleeve according to an embodiment of the present invention;

FIG. 2 an illustration of a longitudinal section of a sliding-sleeve connection according to an embodiment of the present invention, in which an expanded end of a plastic pipe is slid onto a support body of the connecting element and is fixed by means of a sliding sleeve according to the invention; and FIG. 3 a perspective view of a sliding sleeve according to another embodiment of the present invention.

FIG. 1 shows an illustration of a longitudinal section of an embodiment of a sliding-sleeve 1 according to the invention. The sliding-sleeve 1 is made of crosslinked polyethylene (PEXa). The internal surface 1 is irregular-structured and has an average roughness value $R_a$ of 5 µm. According to the invention, average roughness values $R_a$ in a range from 1 µm to half of the average wall thickness of the sliding sleeve 1 are possible. The average roughness values $R_a$ of the internal surface of the sliding-sleeve 1 are preferably in a range from 3 µm to 1000 µm, particularly preferably 5 µm to 50 µm. The average roughness depth $R_z$ of the sliding-sleeve 1 according to the invention which is illustrated in FIG. 1 is 40 µm, wherein the average roughness depths $R_z$ in a range from 5 µm to half the average wall thickness of the sliding sleeve 1 are preferred according to the invention and averaged roughness values $R_z$ in a range from 10 µm to 2000 µm are particularly preferred according to the invention.

The sliding sleeve 1 according to the invention illustrated in FIG. 1 has been produced in that a respective pipe made of crosslinked polyethylene had been extruded, the pipe has been cut by obtaining pieces and the irregular structure of the internal surface 2 of a piece has been produced subsequently by implementation of a steel brush, thereby obtaining the sliding sleeve 1 according to the invention.

FIG. 2 is an illustration of a longitudinal section of an embodiment of a sliding sleeve connection 3 according to the invention with a sliding-sleeve 1 according to the invention. The sliding sleeve connection 3 according to the invention in this case includes an expanded end of a plastic pipe 4 as well as a connecting element 5.

The connecting element 5 is a connecting piece having two support bodies 6, 6a, wherein an end of a plastic pipe 4 is slid onto the support body 6 only. Each of the support bodies 6, 6a here comprises four circumferential external ribs 7, 7a, 7b, 7c, wherein these four circumferential ribs are arranged in axial direction starting from the end of the connecting element 5 in such a way, that an external rib 7 having a sawtooth-like cross-section is followed by two subsequent external ribs 7b, 7a having a rectangular cross section and that another external rib 7 having a sawtooth-like cross-section subsequently follows. Furthermore, the connecting element 5 has a circumferential collar 8, 8a for each support body 6, 6a, which closes off the respective support body 6, 6a.

In the embodiment illustrated in FIG. 2, the connecting element 5 is a component made of polyphenylene sulphone (PPSU). Also usable in alternative embodiments of the pipe connection 3 according to the invention are connecting element 5 made of polypropylene and glass fiber reinforced polypropylene, polyamides and glass fiber reinforced polyamides, polyvinylidene fluoride (PVDF), polyether sulfone (PES), polysulfone (PSU), polyphenyl sulphide (PPS), acrylonitrile-butadiene-styrene copolymer (ABS) and polyester carbonate (PESC), as well as copolymers and blends of said polymers, wherein said polymer materials can also be used fiber reinforced, in particular glass fiber reinforced, or metallic materials, such as brass, in particular Ecobrass®, red brass and stainless steel.

The pipe according to this embodiment of the present invention is an all-plastic pipe made of crosslinked polyethylene (PE-X). All-plastic pipes made of different materials as well as plastic composite pipes and metal-plastic composite pipes can alternatively be used in other embodiments of the present invention. Preferred, however, when using plastic composite pipes and metal-plastic composite pipes is a layer of cross-linked polyethylene (PE-X), in particular PE-Xa, PE-Xb and PE-Xc as the layer facing the internal diameter of the pipe.

According to the invention, another pipe can be connected to the sliding sleeve connection 3 according to the invention at the second support body 6a. The further pipe can have an identical or different construction to the pipe 4 of the support body 6.

Fixing the expanded end 4 to the support body 6 is effected by means of the sliding sleeve 1 according to the invention. In the embodiment shown in FIG. 2, the sliding sleeve 1 according to the invention is a sleeve made of crosslinked polyethylene (in particular PE-Xa, PE-Xb or PE-Xc) having an internal surface 2 with a combination of longitudinal grooves and radial grooves, leading to an average roughness value $R_a$ in a range from 3.4 μm and an averaged roughness depth $R_z$ in a range of 33.

For generating the sliding sleeve connection 3 according to the invention, the sliding sleeve 1 according of the invention is initially slid over the end of the plastic pipe 4. Then, an expansion tool is inserted in to the end of the plastic pipe 4 and the plastic pipe 4 expanded on one end by means of the expansion tool, without expanding the sliding sleeve 1. The support body 6 of the connecting element 5 is inserted into the expanded end of the plastic pipe 4, until the end of the plastic pipe 4 is approximately attached to the circumferential collar 8 of the connecting element 5. Due to the memory effect of the raw material, the expanded end of the plastic pipe 4 shrinks, wherein the synthetic material of the plastic pipe 4 is pressed into the outer contour of the support body 6 of the connecting element 5. Finally, the sliding sleeve 1 according to the invention is slid onto the end of the plastic pipe 4 having the support body 6 inserted therein in axial direction by means of an appropriate sliding tool, such that the end of the plastic pipe 4 is fixed to the support body 6. Eventually further plastic pipes 4 or metal-plastic composite pipes can be connected to further support bodies 6a of the connecting element 5.

Figure 4:
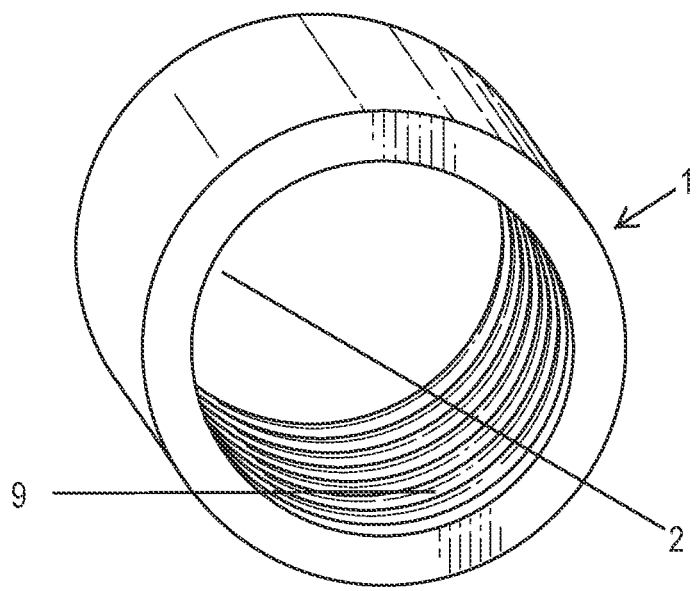
Figure 5:
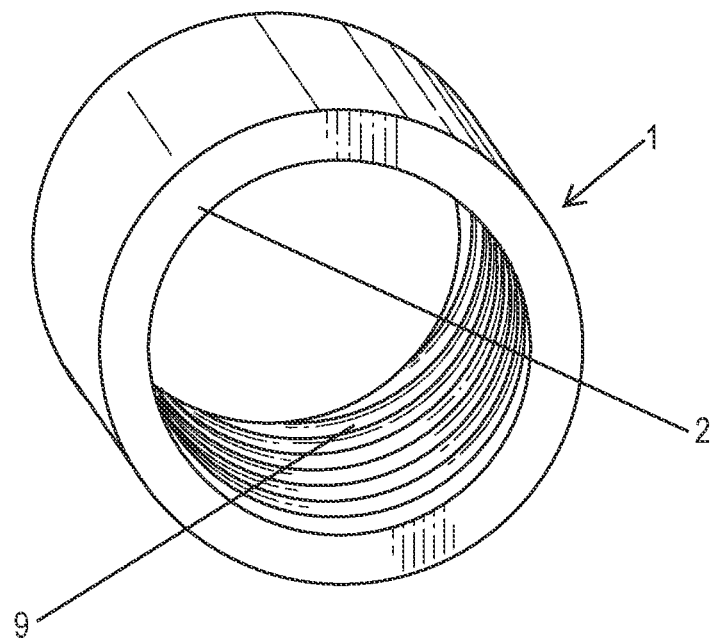

FIG. 3 shows a sliding sleeve 1 according to another embodiment of the present invention in a perspective view. The sliding sleeve 1 according to the invention is made of crosslinked polyethylene (PE-Xa) in this embodiment, too. The internal surface 2 of the sliding sleeve 1 according to the invention has a plurality of macroscopic grooves 9, extending in longitudinal direction of the sliding sleeve 1. Additionally or as an alternative, the grooves 9 may as well extend in circumferential direction of the sliding sleeve 1 as shown in FIG. 4 and/or helically as shown in FIG. 5. In the embodiment shown, the depth of the grooves 9 is approximately 10% of the wall thickness of the sliding sleeve. In alternative embodiments, the depth of the grooves 9 might be smaller or bigger. According to the invention, it cannot exceed half of the average wall thickness of the sliding sleeve 1.

The sliding sleeve 1 illustrated in FIG. 3 has been produced in that the pipe made of crosslinked polyethylene having the respective grooves 9 has been extruded and the pipe has been cut, thereby obtaining sliding sleeves 1 according to the invention.

Measurements Concerning Pressing Force

For measuring the forces required for sliding sleeves made of crosslinked polyethylene onto expanded ends of pipes having a support body of a connecting element inserted therein, an extruded plastic pipe made of crosslinked polyethylene having an external diameter of 38.8 mm has been cut in portions of 34 mm length each.

The portions were subjected to a treatment of the internal surface by means of steel brushes, such that the internal surfaces of the resulting sliding sleeves according to comparative examples and examples according to the invention exhibit the roughness values shown in Table 1. The roughness values were determined by means of Perthometer S2 with PURV3-100, obtained from Mahr GmbH, Gottingen, having an inductive mobile sensor system with interchangeable sensor probe and a 2 μm probe tip in accordance with DIN EN ISO 4288.

The sliding sleeves according to comparative examples and according to examples according to the invention were slid onto the ends of a plastic pipe made of crosslinked polyethylene having a external diameter of 25.8 mm. In each case one support body of identical connecting pieces has been slid into the expanded ends and the sliding sleeves have been slid onto the expanded end having the supporting body inserted therein according to comparative examples by means of a tensile testing machine of the Zwick company, wherein the force exerted upon sliding onto has been measured by means of a load cell. The values obtained are as well indicated in table 1 and represent average values of three measurements.

TABLE 1

|  | $R_a$ [μm] | $R_z$ [μm] | Pressing force [kN] |
| --- | --- | --- | --- |
| Comparative example 1 | 0.5 | 2.2 | 6.0 |
| Comparative example 2 | 0.8 | 3.5 | 5.9 |
| Example 1 | 1.3 | 7 | 5.7 |
| Example 2 | 3.8 | 31 | 5.1 |
| Example 3 | 7.1 | 39 | 4.7 |

The obtained values clearly show that the rough internal surfaces of the sliding sleeves according to the examples 1 to 3 compared to smooth surfaces of sliding sleeves according to the comparative examples 1 and 2 have led to reduced sliding forces.

The present invention has been described in detail with reference to the examples shown in the figures and described in the embodiments of the present invention. It is to be understood, that the present invention is not exclusively limited to the embodiments shown, but that the scope of the present invention results from the attached claims.

The invention claimed is:

1. Sliding sleeve for axially sliding onto an expanded end of an all-plastic pipe or of a plastic composite pipe, into which a support body provided with circumferential external ribs of a connecting element is inserted, wherein the sliding sleeve is made of an elastically deformable polymeric material, wherein the internal surface of the sliding sleeve is configured to decrease a force required for sliding the sliding sleeve onto an expanded end of an all-plastic pipe or of a plastic composite pipe into which a support body provided with circumferential external ribs of a connecting element is inserted by satisfying at least one of the following conditions (A) and (B):

(A) the entire internal surface of the sliding sleeve has an average roughness value Ra in a range from 1 μm to 1000 μm, and (B) the entire sliding sleeve is made of an elastically deformable polymeric material and the internal surface of the sliding sleeve has a plurality of macroscopic irregularities, a depth of which does not exceed half of the average wall thickness of the sliding sleeve.

2. Sliding sleeve according to claim 1, wherein the entire sliding sleeve is made of crosslinked polyethylene.

3. Sliding sleeve according to claim 1,
wherein
the entire sliding sleeve is made of an elastically deformable polymeric material and the internal surface of the sliding sleeve has an average roughness value Ra in a range from 1 µm to 1000 µm.

4. Sliding sleeve according to claim 3, wherein the internal surface of the sliding sleeve has an averaged roughness depth Rz in a range from 5 µm to half of the average wall thickness of the sliding sleeve.

5. Sliding sleeve according to claim 4, wherein the internal surface of the sliding sleeve has an averaged roughness depth Rz in a range from 10 µm to 2000 µm.

6. Sliding sleeve according to claim 3, wherein the structure of the internal surface of the sliding sleeve has been produced in the course of the extrusion of a pipe, from which the sliding sleeve has been obtained by cutting the extruded pipe.

7. Sliding sleeve according to claim 3, wherein the entire sliding sleeve is made of crosslinked polyethylene.

8. Sliding sleeve according to claim 1, wherein the internal surface of the sliding sleeve has an average roughness value Ra in a range from 3 µm to 1000 µm.

9. Sliding sleeve according to claim 8, wherein the entire sliding sleeve is made of crosslinked polyethylene.

10. Sliding sleeve according to claim 1, wherein the internal surface of the sliding sleeve has an average roughness value Ra in a range from 5 µm to 50 µm.

11. Sliding sleeve according to claim 1,
wherein
the entire sliding sleeve is made of an elastically deformable polymeric material and the internal surface of the sliding sleeve has a plurality of macroscopic irregularities, the depth of which does not exceed half of the average wall thickness of the sliding sleeve.

12. Sliding sleeve according to claim 11, wherein the internal surface of the sliding sleeve has grooves in a circumferential direction.

13. Sliding sleeve according to claim 11, wherein the structure of the internal surface of the sliding sleeve has been produced in the course of the extrusion of a pipe, from which the sliding sleeve has been obtained by cutting the extruded pipe.

14. Sliding sleeve according to claim 11, wherein the internal surface of the sliding sleeve has grooves in a longitudinal direction.

15. Sliding sleeve according to claim 11, wherein the entire sliding sleeve is made of crosslinked polyethylene.

16. Sliding sleeve according to claim 11, wherein the internal surface of the sliding sleeve has helically-extending grooves.

17. Sliding-sleeve connection between one end of an all-plastic pipe or of a plastic-composite pipe and a connecting element, comprising:
the extruded end of the all-plastic pipe or of the plastic composite pipe;
the connecting element having the at least one support body provided with circumferential external ribs onto which is slid the expanded end of the all-plastic pipe or of the plastic composite pipe in the final sliding-sleeve connection; and
the sliding sleeve according to claim 11 axially slid onto the expanded end.

18. Sliding-sleeve connection according to claim 17, wherein the entire sliding sleeve is made of crosslinked polyethylene, the all-plastic pipe or the plastic composite pipe comprises crosslinked polyethylene, and the at least one support body comprises a polymer material.

19. Sliding-sleeve connection between one end of an all-plastic pipe or of a plastic-composite pipe and a connecting element, comprising:
the extruded end of the all-plastic pipe or of the plastic composite pipe;
the connecting element having the at least one support body provided with the circumferential external ribs onto which is slid the expanded end of the all-plastic pipe or of the plastic composite pipe in the final sliding-sleeve connection; and
the sliding sleeve according to claim 1 axially slid onto the expanded end.

20. Method for producing a connection between an end of an all-plastic pipe or a plastic-composite pipe and a connecting element having at least one support body provided with circumferential external ribs, the method comprising the following steps of:
expanding the end of the all-plastic pipe or of the plastic composite pipe;
inserting the support body of the connecting element into the expanded end of the all-plastic pipe or of the plastic composite pipe;
and
pressing the sliding sleeve according to claim 1 in axial direction onto the expanded end with the support body inserted therein.

* * * * *